United States Patent
Ackley

[11] Patent Number: 6,152,991
[45] Date of Patent: *Nov. 28, 2000

[54] MULTILAYER ADSORBENT BEDS FOR PSA GAS SEPARATION

[75] Inventor: Mark William Ackley, East Aurora, N.Y.

[73] Assignee: Praxair Technology, Inc., Danbury, Conn.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,411

[22] Filed: Apr. 17, 1997

[51] Int. Cl.[7] .................................................. B01D 53/047
[52] U.S. Cl. ................................... 95/96; 95/119; 95/130; 96/130; 96/132; 96/144
[58] Field of Search ...................... 95/96–105, 117–119, 95/121, 122, 130, 139; 96/108, 130–132, 144, 154

[56] References Cited

U.S. PATENT DOCUMENTS

| | | | |
|---|---|---|---|
| 3,636,679 | 1/1972 | Batta | 55/26 |
| 3,866,428 | 2/1975 | Simonet et al. | 95/121 X |
| 4,026,680 | 5/1977 | Collins | 55/26 |
| 4,636,225 | 1/1987 | Klein et al. | 96/132 X |
| 4,859,217 | 8/1989 | Chao | 55/68 |
| 5,114,440 | 5/1992 | Reiss | 55/25 |
| 5,152,813 | 10/1992 | Coe et al. | 95/103 |
| 5,169,413 | 12/1992 | Leavitt | 95/96 |
| 5,174,979 | 12/1992 | Chao et al. | 95/96 |
| 5,203,887 | 4/1993 | Toussaint | 55/25 |
| 5,258,060 | 11/1993 | Gaffney et al. | 95/101 |
| 5,268,023 | 12/1993 | Kirner | 95/103 |
| 5,382,280 | 1/1995 | Choe et al. | 95/105 X |
| 5,505,764 | 4/1996 | Fuentes | 95/121 X |
| 5,520,721 | 5/1996 | Fraysse | 95/114 |
| 5,529,610 | 6/1996 | Watson et al. | 95/100 |
| 5,624,477 | 4/1997 | Armond | 95/139 X |
| 5,656,066 | 8/1997 | Reiss et al. | 95/101 X |
| 5,674,311 | 10/1997 | Notaro et al. | 95/96 |

FOREIGN PATENT DOCUMENTS

| | | |
|---|---|---|
| 0512781A1 | 11/1992 | European Pat. Off. . |
| 0756886A2 | 2/1997 | European Pat. Off. . |
| 0757919A1 | 2/1997 | European Pat. Off. . |
| 4-293513 | 10/1992 | Japan . |

OTHER PUBLICATIONS

Ralph T. Yang, "Gas Separation by Adsorption Processes", *Butterworths Publishers*, 1987.

Kumar, "Vacuum Swing Adsorption Process for Oxygen Production—A Historical Perspective"; *Separation Science and Technology*, 31(7), pp. 877–893, 1996.

Primary Examiner—Robert H. Spitzer
Attorney, Agent, or Firm—Robert J. Follett

[57] ABSTRACT

The invention comprises a PSA process and apparatus wherein the fixed adsorbent bed comprises an equilibrium zone and a mass transfer zone. Further, the equilibrium and mass transfer zones each comprise at least one adsorbent material, selective for the adsorption of a more selectively adsorbable component, that is selected on the basis of the performance of that adsorbent material under the process conditions applicable to either the equilibrium or mass transfer zones.

13 Claims, 7 Drawing Sheets

MULTILAYER ADSORBENT BEDS FOR PSA GAS SEPARATION

FIELD OF THE INVENTION

The invention relates to pressure swing adsorption (PSA) processes and apparatus, more particularly to the use of high performance adsorbents in PSA processes and systems through the novel deployment of such adsorbents in layers.

BACKGROUND

Cryogenic methods have dominated air separation processes for many years where high purity $O_2$, $N_2$ and/or Ar are desired. More recently, both membrane and adsorption processes have become important commercially. In particular, PSA, including superatmospheric adsorption/desorption processes, subatmospheric vacuum swing adsorption (VSA) and transatmospheric vacuum pressure swing adsorption (VPSA) processes are well known in the art. Such methods are typically used to produce oxygen having a purity between about 90 to 95%. There is an increasing need for this purity $O_2$ in such diverse industries as steel making, glass making and pulp and paper production. Single plant oxygen capacity for such adsorption processes now exceeds 100 tons-per-day contained $O_2$ (TPDO), and applications continue to arise demanding even greater capacities. At these production and purity levels, $O_2$ product cost is lower by adsorption than by cryogenic methods, while for larger capacities, economies of scale currently favor the cryogenic methods. Nevertheless, there continues to be considerable economic incentive to extend the production range of adsorption processes for air separation. This must be accomplished by improving performance while reducing the cost of power and capital.

A typical adsorption system for the production of $O_2$ includes one or more adsorber vessels containing a layer of pretreatment adsorbent for removing atmospheric contaminants followed by a main adsorbent. The pretreatment adsorbent can be any material primarily effective in removing $H_2O$ and $CO_2$, e.g. zeolites, activated alumina, silica gel, activated carbon and other such adsorbents. The main adsorbent material, which usually represents at least 90% of the total volume of adsorbent in the vessel is $N_2$-selective, typically from the type A or type X family of zeolites. While many different adsorption cycles have been developed for $O_2$ production, all pressure swing cycles contain the four basic steps of pressurization, adsorption, depressurization and desorption. When multiple beds are used, the beds are sequenced out of phase for the different cycle steps in order to maintain a constant flow of product. One of many examples of such processes illustrating these basic features is given by Batta in U.S. Pat. No. 3,636,679.

There has been significant development of the various PSA, VSA and VPSA methods for air separation over the past thirty years, with major advances occurring during the last decade. Commercialization of these processes and continued extension of the production range can be attributed primarily to improvements in the adsorbents and process cycles, with advances in adsorber design contributing to a lesser degree. Highly exchanged lithium molecular sieve adsorbents, as illustrated by Chao in U.S. Pat. No. 4,859,217, are representative of advanced adsorbents for $O_2$ production. A historical review of both adsorbent and process cycle development may be found in Kumar (Sep. Sci. and Technology, 1996).

The increase in $N_2/O_2$ selectivity and $N_2$ working capacity associated with $N_2$-selective advanced adsorbents is largely responsible for the improvements in $O_2$ recovery and reduction in power and bed size factor (BSF). Such adsorbents, however, often have higher heats of adsorption, are more difficult to manufacture and may have poorer mass transfer characteristics, all resulting in a higher adsorbent cost. While many new adsorbents have been developed claiming improved properties for air separation, only a few have been implemented successfully in commercial processes. Advanced adsorbents often fail or fall short of expectations since process performance is projected on the basis of adsorbent equilibrium properties and isothermal process conditions.

Collins in U.S. Pat. No. 4,026,680 teaches that adiabatic operation intensifies the thermal effects in the adsorbent bed inlet zone. In particular he teaches that there is a "sharply depressed temperature zone," (hereinafter referred to as a "cold zone"), in the adsorption bed inlet end. This zone is as much as 100° F. below the feed gas temperature. Such a zone results in a thermal gradient over the length of the adsorbent bed of approximately the same magnitude (e.g. about 100° F.). Collins suggests that the cold zone arises from the coupling of an "inadvertent heat-regenerative step" at the inlet end of the bed with the thermal cycling resulting from the adsorption/desorption steps of the process. The regenerative effect may be partly the result of the adsorption of water vapor and carbon dioxide in a pretreatment zone located ahead of the main adsorbent.

The thermal cycling that occurs in an adiabatic process results in an adverse thermal swing, i.e. the adsorption step occurs at a higher temperature than the desorption step. This thermal swing tends to increase with increasing adsorbate/adsorbent heats of adsorption and increasing ratio of adsorption to desorption pressure. These gradients and swings in bed temperature result in various parts of the adsorbent bed functioning at different temperatures. The $N_2/O_2$ selectivity and $N_2$ working capacity of any particular adsorbent may not be effectively utilized over such wide ranges in bed temperature. Dynamic adsorbent properties that vary strongly with temperature are also likely to result in process instability when operating conditions, such as ambient temperature, change.

Considerable attention has been given to eliminating or minimizing the cold zone in adiabatic adsorbers since Collins. Earlier suggestions included raising the feed temperature using external heating or through partial bypass of the feed compressor aftercooler.

Collins proposed the use of heat conducting rods or plates extending the length of the bed for the same purpose. Others have extended this concept by replacing the rods or plates with hollow tubes filled with liquid to provide heat transfer by convection between the warmer product end and the colder feed end of the adsorber. For example, the cold zone temperature is increased from −70° C. to near 0° C. in Fraysse et al. (U.S. Pat. No. 5,520,721) by supplying a heat flux to a passage between the pretreatment and main adsorbents. The primary intent in all of these methods is to elevate the minimum temperature near the feed inlet of the adsorber using direct and/or indirect heat exchange. The entire bed temperature is elevated along with the cold zone temperature when the feed is heated, however, and the overall size of the thermal gradient in the bed remains relatively unaffected.

Another approach attempts to match an adsorbent with a temperature that is most efficient for the desired separation. Typical of such teachings, an adsorbent bed is divided into layers that are maintained at different temperatures using embedded heat exchangers to affect distinct separations.

Armond (EP 0512781 A1) claims to inhibit the effect of the cold zone by selecting two unspecified adsorbents with high removal efficiency for $N_2$, at $-35°$ C. to $-45°$ C. and at ambient temperature, respectively. The low temperature material is located near the feed inlet (but downstream of the pretreatment adsorbent) and is followed by the second material.

A main adsorbent, containing at least two layers, has been disclosed by Watson et al. (U.S. Pat. No. 5,529,610) for $O_2$ production. Watson teaches that no commercially available adsorbent functions optimally over the large temperature gradient (as much as 100° F.) that exists in the main adsorbent region of the bed. NaX zeolite, comprising from 20% to 70% of the total adsorbent volume, is chosen for the lowest temperature region of the bed due to its low capacity and high selectivity at such temperatures. The second layer is preferably CaX zeolite, although other high capacity, high nitrogen selectivity adsorbents are also proposed for this region.

Co-pending and commonly assigned application Ser. No. 08/546,325, now U.S. Pat. No. 5,674,311, to Leavitt et al. discloses layered beds in which the adsorbents are selected according to optimum adsorption figures-of-merit (AFM) at particular temperatures in the bed. The figure-of-merit index is computed from equilibrium properties of the adsorbent. As with the teachings cited above, Leavitt teaches that one should address large thermal gradients (e.g. about 70° F.) in an adsorber.

Reiss teaches in U.S. Pat. No. 5,114,440 a VSA process for $O_2$ enrichment of air using two or three layers of CaA zeolite of varying $N_2$ capacity for the main adsorbent. The CaA adsorbents are arranged such that the material of lowest $N_2$ capacity is placed near the feed inlet while that of highest $N_2$ capacity is located near the product end of the adsorber. Power consumption was shown to be lower for the layered CaA adsorber as compared to adsorbers containing CaA of uniform $N_2$ capacity and an adsorber containing NaX near the feed inlet followed by CaA near the product end.

JP Appl. No. 4-293513 teaches that improved stability of operation (less variability in bed size factor (BSF), power, and final desorption pressure) is achieved under varying ambient temperatures ($-10°$ C. to 40° C.) in VPSA $O_2$ production using a layered main adsorbent bed consisting of equal volumes of CaA and CaX zeolites when compared to adsorbers containing either of the individual adsorbents alone. The CaA zeolite is located near the feed end and is followed by the CaX adsorbent.

Multiple adsorbent layers have also been proposed in order to reduce the overall cost of product $O_2$. Such an approach is disclosed in U.S. Pat. No. 5,203,887 (Toussaint), wherein a layer of less costly NaX replaces LiX adsorbent in a section of the main adsorbent nearest the product end. An alternative to this two-layer arrangement for the main adsorbent is the addition of a third layer (NaX) between the LiX and the pretreatment layer near the feed inlet of the adsorber.

Thus, the prior art has focused upon mitigating the apparent undesirable effects of the subambient cold zone through heat transfer means and/or by selection of an appropriate adsorbent for the low temperature region of the bed. Layering of adsorbents has been proposed as a means of improving separation efficiency in the presence of large bed temperature gradients (50–100° F.). While the most commonly suggested adsorbents for the cold zone are NaX and CaA zeolites, a variety of adsorbents have been recommended for the regions of the bed beyond the cold zone.

OBJECT OF THE INVENTION

It is therefore an object of the invention to provide a PSA process and apparatus that achieve improved efficiency, reduced cost and extended production ranges for PSA air separation processes using advanced adsorbents.

It is a further object of the invention to provide a PSA process and system having no cold zone and consequently small (e.g. less than about 50° F.) temperature gradients.

It is a further object of the invention to provide a PSA apparatus requiring no additional equipment for heat addition or removal from the adsorber.

SUMMARY OF THE INVENTION

The invention comprises a PSA process and apparatus wherein the fixed adsorbent bed comprises an equilibrium zone and a mass transfer zone. Further, the equilibrium and mass transfer zones each comprise at least one adsorbent material, selective for the adsorption of a more selectively adsorbable component, that is selected on the basis of the performance of that adsorbent material under the process conditions applicable to said zone.

In a preferred embodiment, at least one adsorbent material selected for the equilibrium zone is selected on the basis of said adsorbent material's adiabatic separation factor for a gas mixture of two or more components.

In another preferred embodiment, at least one adsorbent material selected for either the equilibrium zone or the mass transfer zone is selected on the basis of said adsorbent material's adiabatic separation factor for a gas mixture of two or more components.

In another preferred embodiment, at least one adsorbent material selected for either the equilibrium zone or the mass transfer zone is selected in view of the different gas compositions in said zones during at least one of adsorption or desorption.

In still another preferred embodiment, at least one adsorbent material selected for the mass transfer zone has a comparatively high adiabatic separation factor for the more adsorbable material and a comparatively low adiabatic delta loading for the less adsorbable component under the process conditions applicable to said zone.

In another preferred embodiment, the gas mixture is air.

It should be noted that the terms "working capacity", "dynamic capacity" and "delta loading" as used herein are interchangeable. Also for the purposes of this invention, the property referred to by these terms is determined under adiabatic operation.

BRIEF DESCRIPTION OF THE DRAWINGS

Other objects, features and advantages will occur to those skilled in the art from the following description of preferred embodiments and the accompanying drawings, in which.

DETAILED DESCRIPTION OF THE INVENTION

The present invention provides improved efficiency, reduced cost and extended production ranges for PSA, VSA and VPSA air separation processes using advanced adsorbents to produce oxygen having a purity of between about 90% to 95% by volume. An essential factor in the invention is the recognition that thermal gradients in adsorbers employing such advanced materials are much smaller (about 34–36° F.) than those disclosed in the prior art (typically about 100° F.). According to the invention, improved PSA performance is achieved if adsorbents are selected and layered in equilibrium and mass transfer zones in an adsorbent bed on the basis of adiabatic selectivity and adiabatic working capacity at the prevailing temperatures and feed gas compositions in each zone. This represents a complete departure from prior art systems, wherein adsorbents were selected on the basis of their equilibrium behavior at particular temperatures, and on the observation of high thermal gradients in adsorbent beds.

Further, because adsorbents are selected in the present invention such that the adsorber has no cold zone, additional costly equipment is not required for heat addition or removal from the adsorber as in the prior art. Several Li-exchanged type X adsorbents, including those containing mixed cations, have been identified to achieve such results.

The prior art has given much attention to increasing the heavy component ($N_2$) capacity of the adsorbent. Further, it has recognized that it is also important to reduce the coadsorption of the light component ($O_2$) in order to maximize recovery. Light component coadsorption becomes more pronounced at low temperatures (e.g. <270K) for some adsorbents.

The prior art has not recognized, however, that a large percentage of the total amount of coadsorbed light component is contained in a particular region of an adsorbent bed, e.g. the mass transfer zone. Consequently, as the cycle time decreases, lower light product recovery occurs as the fixed size of the mass transfer zone becomes an increasing fraction of the overall bed size. The invention represents a departure from the prior art in that it takes all of these factors: temperature, oxygen coadsorption, and mass transfer zone, into consideration in the selection of adsorbent materials for an adsorbent bed.

Figure 1:
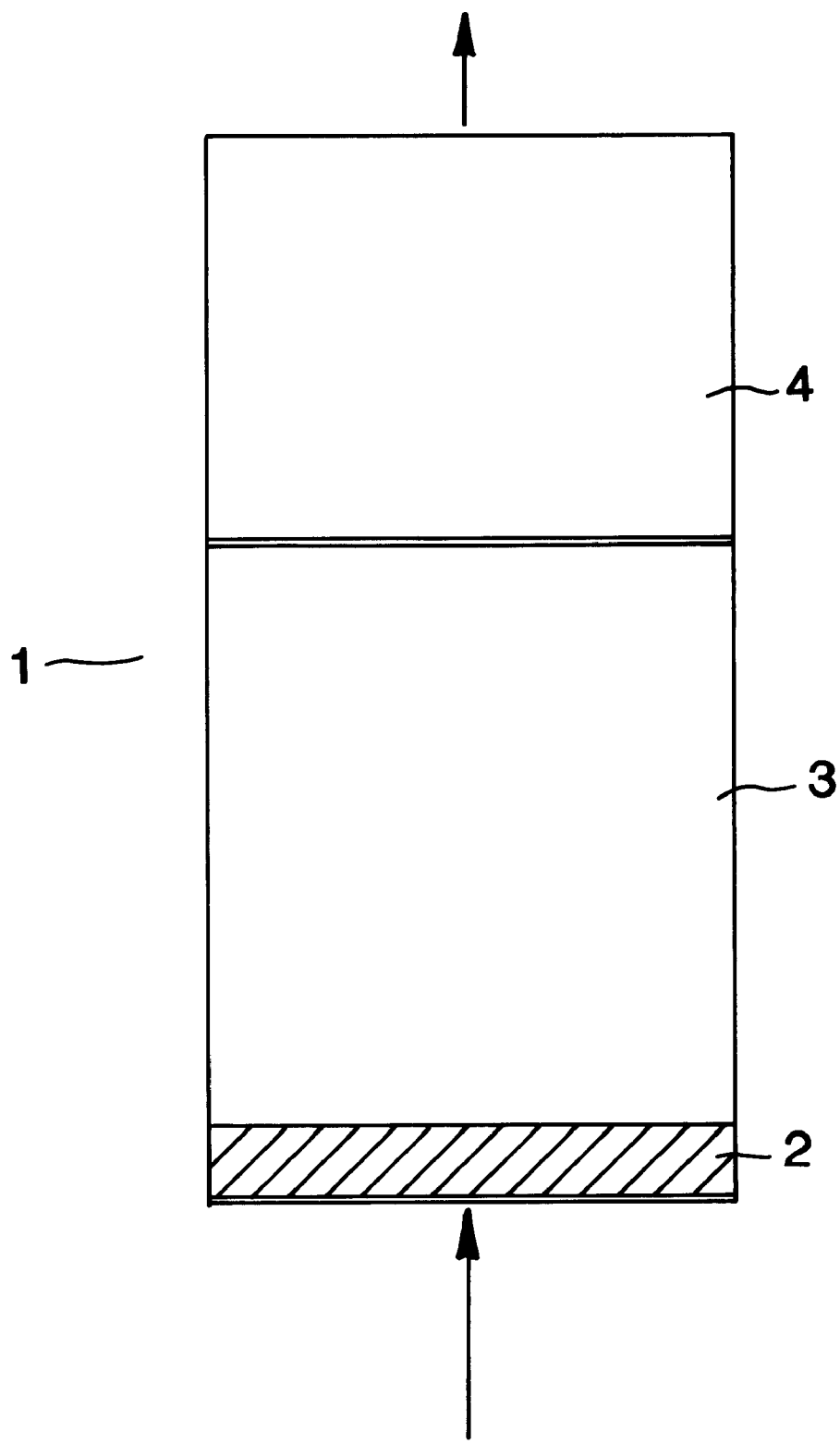
FIG. 1 is a schematic diagram of an embodiment of the invention wherein the overall structure of a fixed adsorbent bed is set forth; the arrows indicate the direction of gas flow through the bed during adsorption.

The invention may be accomplished through the deployment of adsorbents, as shown in FIG. 1, into three distinct adsorption zones in an adsorbent bed 1: pretreatment zone 2, equilibrium zone 3 and mass transfer zone 4. Adsorbents are selected for the latter two zones 3 and 4 on the basis of adiabatic selectivity and adiabatic working capacity at the prevailing temperatures and compositions in each zone. In addition, through the invention, the coadsorption of $O_2$ may be minimized, particularly in the mass transfer zone.

Figure 2A:
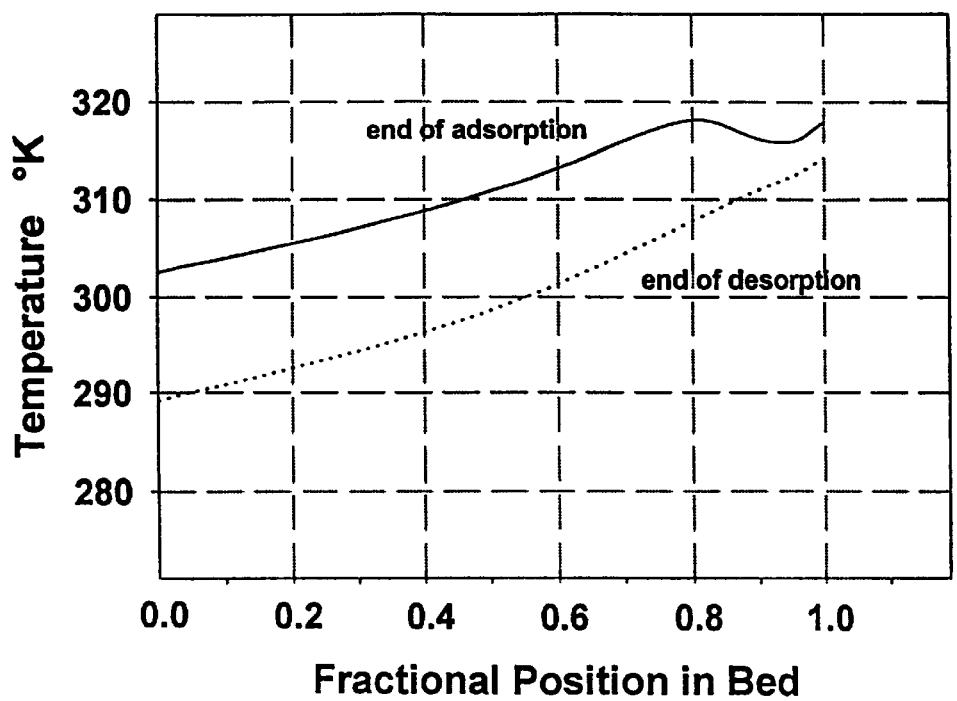
FIG. 2a is a graph showing adsorbent bed temperature across the bed at the end of adsorption and desorption.

A typical temperature distribution in an adsorber containing only highly-exchanged LiX adsorbent, operating in a commercial level $O_2$ production process, has been derived and is illustrated in FIG. 2a. At the end of adsorption, the total temperature gradient in the main adsorbent is less than 16° K (29° F.). This example is typical for high performance $N_2$-selective adsorbents (such as LiX) for which there may be no significant cold zone and the entire bed operates with a modest thermal gradient (e.g. less than 50° F.). An ideal adsorbent for the equilibrium zone is one possessing high adiabatic $N_2/O_2$ selectivity, high adiabatic $N_2$ dynamic capacity and good thermal stability in the desired operating range of temperature and pressure.

Figure 2B:
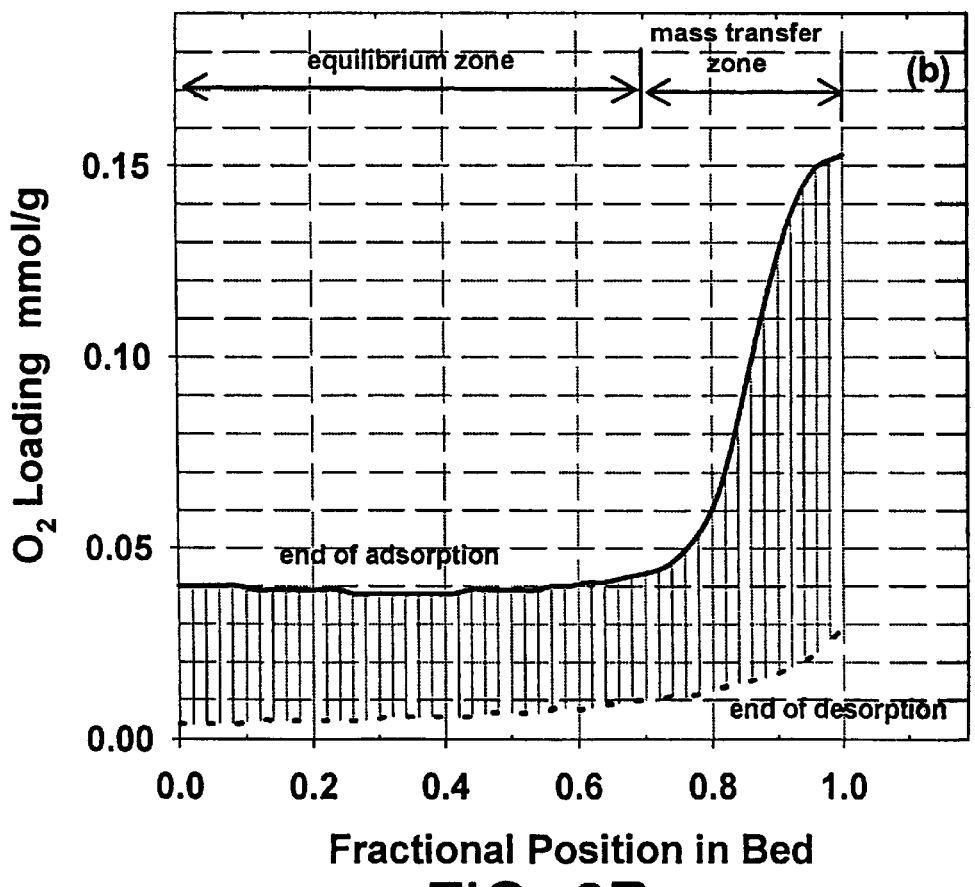
FIG. 2b is a graph showing the oxygen loading in mmol/g across the length of the same adsorbent bed at the end of adsorption and desorption.

The $O_2$ loading distributions in the main adsorbent at the end of adsorption and at the end of desorption steps are shown in FIG. 2b. The difference between these two distributions (shown as the shaded area in FIG. 2b) represents the amount of coadsorbed $O_2$ or adiabatic dynamic $O_2$ capacity in an actual adiabatic process. This coadsorbed $O_2$, largely lost in the desorption step along with the waste $N_2$, is the primary factor effecting the $O_2$ recovery, and consequently the efficiency, of the process. As is evident from FIG. 2b, between 40% and 60% of the coadsorbed $O_2$ is contained in the mass transfer zone. Thus, the appropriate adsorbent for the mass transfer zone should have high adiabatic selectivity for $N_2/O_2$ and low adiabatic dynamic $O_2$ capacity (e.g. low adiabatic delta oxygen loading) in a region of increasing temperature and $O_2$ concentration.

Since the prior art has selected main adsorbent(s) upon the basis of an effectiveness evaluated at equilibrium conditions, thus effectively treating the entire bed as an equilibrium zone, the resulting amount of coadsorbed $O_2$ has been significantly underestimated from that which occurs in the real process. In addition the selection of adsorbents in the prior art has been made without consideration of the adverse temperature swing that occurs between adsorption and desorption conditions. Furthermore, while the prior art has taught the use of different adsorbents in order to optimize efficiency over very large thermal gradients in the adsorbent bed, these gradients can, in fact, be significantly minimized through the practice of the present invention.

The invention recognizes that one should separate the main adsorbent into equilibrium and mass transfer zones, and select adsorbents on the basis of their adiabatic selectivity and adiabatic working capacity at the different conditions that occur in each zone. Deployment of adsorbents according to this invention has resulted in an increase in the $O_2$ recovery and productivity and a decrease in BSF and power compared to prior art systems.

As indicated above, adsorbents are deployed by the method of this invention in three distinct adsorption zones as illustrated in FIG. 1. One or more adsorbents may be contained in each zone. The pretreatment zone 2 is nearest the feed inlet and its purpose is to remove any undesirable contaminants from the feed stream. Typical contaminants in air separation are water and carbon dioxide. Those skilled in the art will appreciate the use of zeolites, activated alumina, silica gel, activated carbon as well as other appropriate adsorbents in the pretreatment zone. The equilibrium 3 and mass transfer 4 zones contain adsorbent(s) selective for the primary heavy components in the feed. These are the main adsorbents.

The method of adsorbent evaluation is important to the selection of main adsorbents for the equilibrium 3 and mass transfer 4 zones. The objective is to estimate the separation behavior of an adsorbent under actual process conditions. This is accomplished by defining adiabatic selectivity (e.g. separation factor) and adiabatic working (e.g. dynamic) capacity as given in Equation (1). As applied below a binary air feed composition is exemplified.

$$\alpha = \frac{\Delta N_2}{\Delta O_2} = \frac{L_{N2}(y_i, P_H, T_1)_{ads} - L_{N2}(y_i, P_L, T_2)_{des}}{L(y_i, P_H, T_1)_{ads} - L_{O2}(y_i, P_L, T_2)_{des}} \quad (1)$$

In Equation (1), the amount of adsorbate or loading ($L_i$) is evaluated for each constituent at the end of the adsorption and desorption steps at the temperature ($T_1, T_2$), pressure ($P_H, P_L$) and composition ($y_i$ (in mole fraction)) prevailing in the individual zones. The terms in the numerator and denominator of Equation (1) represent the heavy ($N_2$) and light ($O_2$) component adiabatic working capacities, respectively. This evaluation is accomplished using any appropriate multicomponent isotherm model such as the loading ratio correlation set forth in Yang, *Gas Separation by Adsorption Processes*, 1987). Those skilled in the art will appreciate that the use of such a model requires representative adsorption data for the adsorbent and gas components of interest.

For example, the temperature swing ($T_1-T_2$) must be determined from either experiment or adiabatic process simulation, (e.g. see in FIG. 2). Equation (1) is then applied to determine the variation in separation factor with temperature in the equilibrium zone. Adsorption ($P_H$) and desorption ($P_L$) pressures of 1.5 bar and 0.3 bar, respectively, were used in the examples of FIGS. 2–6.

In addition, the highly lithium exchanged forms of zeolite X that are used in the preferred practice of the invention comprise zeolite X adsorbent having a framework $SiO_2/Al_2O_2$ molar ratio not greater than 3 and having at least 88%, of its $AlO_2$ tetrahedral units associated with lithium cations, with preferably at least 95% of said $AlO_2$ tetrahedral units being associated with lithium cations. More preferably, said lithium exchange is from about 95% to about 97%, or above. Such special adsorbent materials include other materials in which the $SiO_2/Al_2O_3$ molar ratio is from 2.0 to 2.5. These adsorbents are described in detail in Chao (U.S. Pat. No. 4,859,217).

Figure 3:
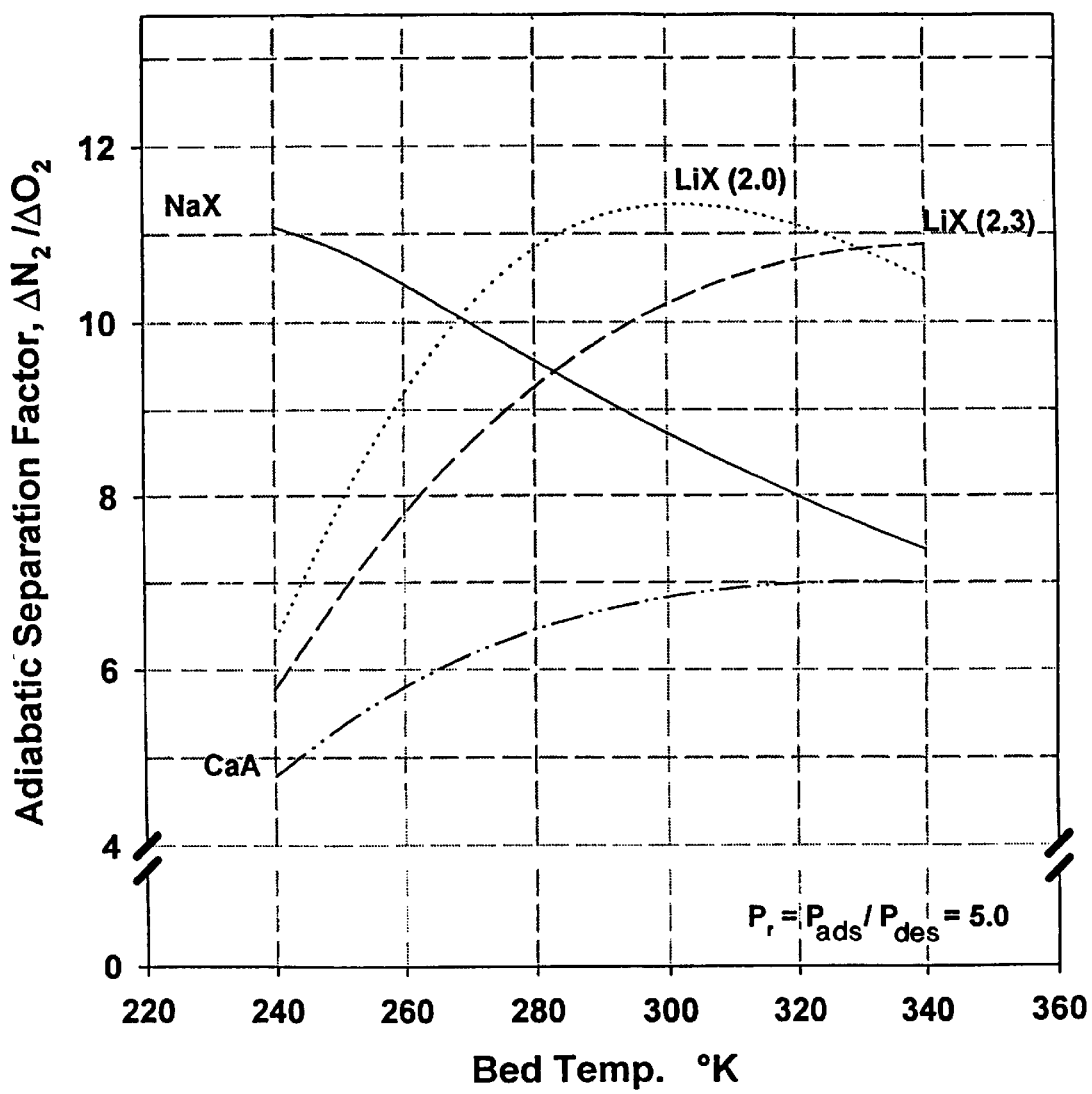
FIGS. 3 and 5 are graphs showing the variation of adiabatic separation factor with the bed temperature (wherein the temperature is measured at the end of adsorption), for a series of adsorbents at a pressure ratio (adsorption pressure:desorption pressure) of 5.

Referring to FIG. 3, the adiabatic separation factor was determined for CaA (5A MG (medical grade), NaX (13X), LiX ($SiO_2/A_2O_2$=2.3) and LiX ($SiO_2/Al_2O_2$=2.0) adsorbents based on bed temperatures at the end of the adsorption step.

Figure 4:
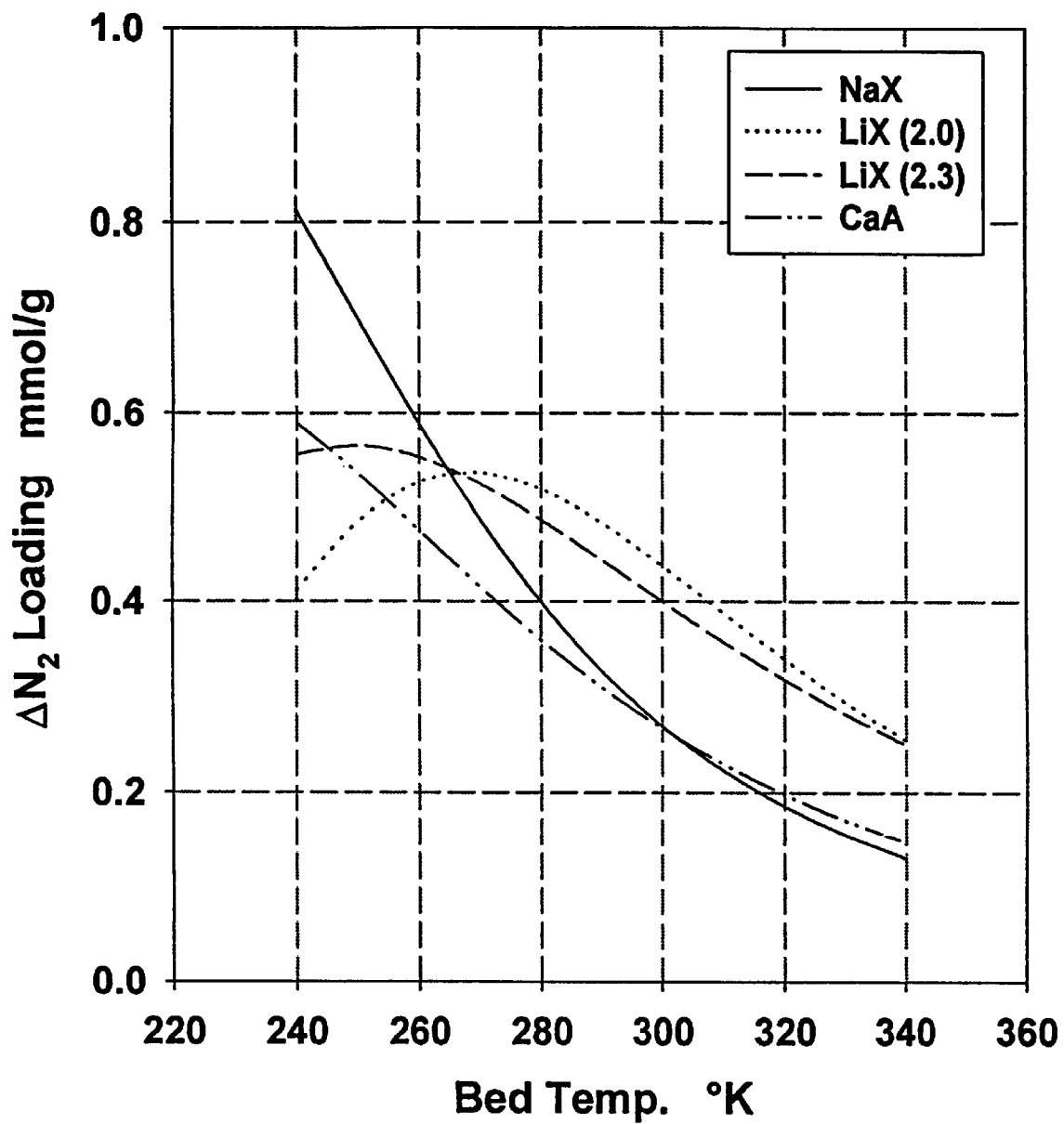
FIG. 4 is a graph showing the variation of adiabatic nitrogen working capacity (e.g. adiabatic delta nitrogen loading) with the bed temperature (wherein the temperature is measured at the end of adsorption), for a series of adsorbents.

FIG. 4 sets forth the adiabatic $N_2$ working capacity for the same adsorbents.

It is evident from the results set forth in FIGS. 3 and 4 that the LiX adsorbents have as much as twice the adiabatic $N_2$ working capacity and nearly 1.5 times the adiabatic selectivity compared to the conventional CaA and NaX adsorbents. In light of this, LiX adsorbents are the most preferred material (of those compared) for the equilibrium zone when temperatures in the bed are greater than about 270° K. In addition, the modest selectivity variation of the LiX adsorbents in this temperature range implies good process thermal stability (e.g. the change in adiabatic separation factor with temperature is minimal).

Further, FIG. 2a shows that at the end of the adsorption step a LiX (2.3) adsorbent bed, for example, has a temperature between about 300° K and 320° K. From FIG. 3 it is clear that in this same temperature range LiX materials have a significantly higher adiabatic separation factor than either NaX or CaA. As such, separation is maximized at every position in the equilibrium zone of the bed. Thus, as compared to the prior art, there is no need to alter the bed temperature or gradient using additional heat transfer devices.

FIGS. 3 and 4 show that NaX has superior adiabatic selectivity and adiabatic $N_2$ working capacity at temperatures below 270° K, however, the thermal stability will be low due to the fact that the separation factor declines steadily with increasing temperature.

Figure 5:
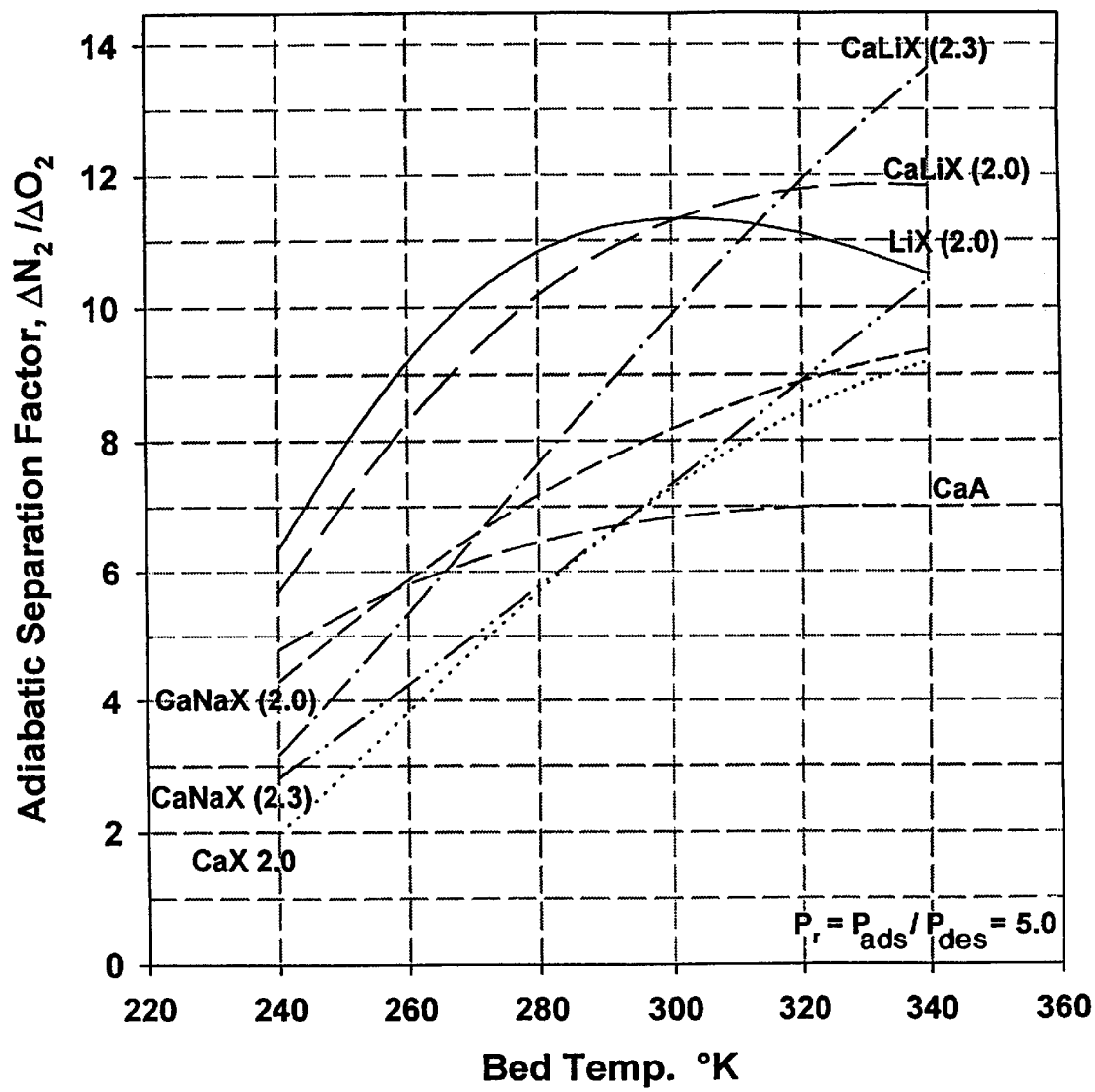

The variation of adiabatic separation factor with temperature for several other adsorbents has been compared to that of LiX (2.0) in FIG. 5. The CaLiX adsorbents (less than 30% Ca) also show promise for the equilibrium zone, particularly for bed temperatures above 300° K. Illustrative of such high Li-content adsorbents are those described by Chao et al. (U.S. Pat. No. 5,174,979). Compared to LiX (2.0), the adiabatic $N_2$ working capacity of CaLiX (2.0) is slightly greater while that for CaLiX (2.3) is 20% to 40% lower. The CaLiX (2.0) material appears to have better thermal stability while CaLiX (2.3) has higher adiabatic selectivity for temperatures above 320° K.

The adsorption of feed gas components occurs in the mass transfer zone, thus this is a region of continuously varying gas composition. In many adsorption processes, the mass transfer zone forms rapidly and moves through the adsorbent at a steady rate. Combining the selection and deployment of the proper adsorbent with appropriate operating conditions results in retention of the heavy component in preference to the light component in such a way that the desired separation is affected.

The purity of the light component increases in the mass transfer zone from feed concentration at the rear of the zone to the product concentration at the zone front. It is generally in the interest of maintaining acceptable product purity to stop the adsorption step prior to the breakthrough of the mass transfer zone at the product end of the bed as described in Batta (U.S. Pat. No. 3,636,679).

At the end of the adsorption step that part of the adsorbent nearest the feed end is in equilibrium with the feed composition, temperature and pressure. Ideally, the remainder of the adsorbent near the product end contains just the mass transfer zone.

The condition described above is reflected in FIG. 2b, where the equilibrium and mass transfer zones are quite distinguishable. As shown therein, in the case of air separation, a considerable fraction of the potential $O_2$ product is retained in the mass transfer zone at the end of the adsorption step. The efficiency of the process can be improved if this retained $O_2$ is minimized by selecting adsorbents in accordance with the teachings of the invention, i.e. selecting an adsorbent with minimum adiabatic $O_2$ working capacity, but high $N_2/O_2$ selectivity for the mass transfer zone.

The adsorption requirement in the mass transfer zone is quite different than in the equilibrium zone. In the equilibrium zone, it is desirable to remove and discharge as much heavy component as possible while minimizing the amount of light component adsorbed. For air separation, the 4:1 $N_2/O_2$ composition ratio of the feed in the equilibrium zone is advantageous for the separation. This advantage is lost in the mass transfer zone as the mole fraction of $O_2$ in the feed increases from 0.21 to 0.90, i.e. the adsorption of $O_2$ is greatly enhanced as its concentration exceeds that of $N_2$. Thus, high adiabatic $N_2$ working capacity is not as important as low adiabatic $O_2$ working capacity in the mass transfer zone, while high adiabatic $N_2/O_2$ selectivity is essential to maintaining product purity and minimizing the size of the mass transfer zone. The temperature variation in this zone is small and much less important than the gas composition change as can e inferred from FIG. 2. The most suitable adsorbents for the mass transfer zone can be determined by applying Equation (1) and these criteria.

Figure 6A:
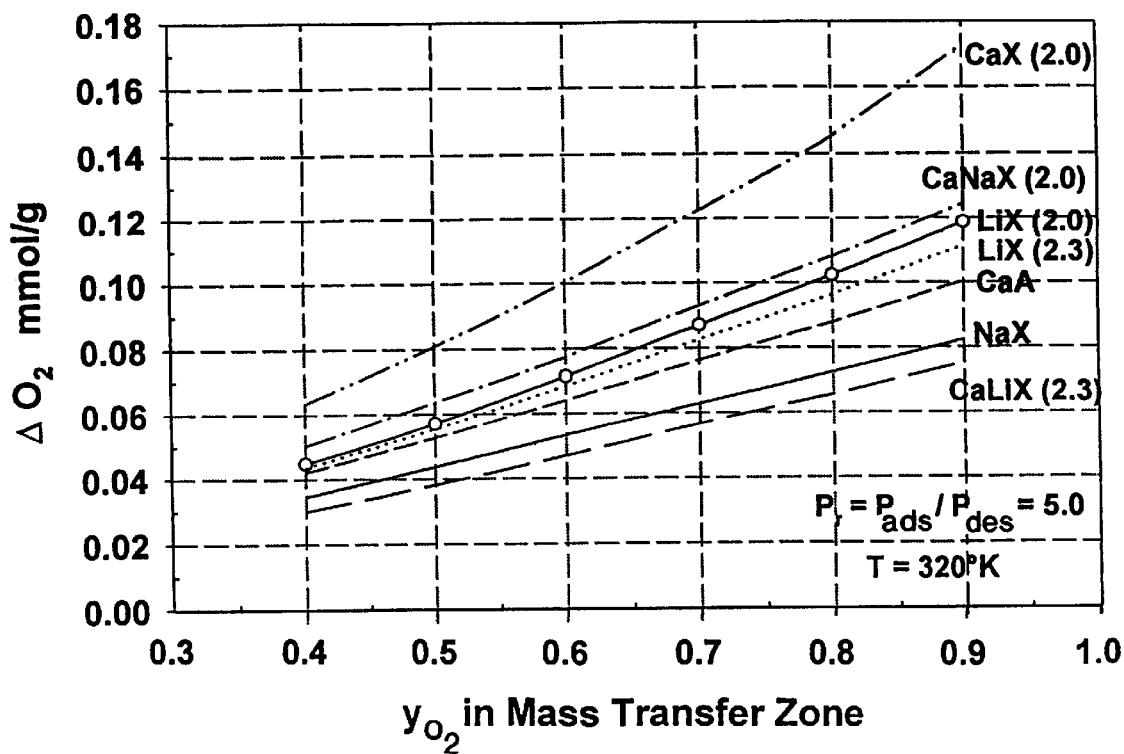
FIG. 6a is a graph showing the variation in delta oxygen loadings as a function of oxygen content in the mass transfer zone of the adsorbent bed, for a series of adsorbents.
Figure 6B:
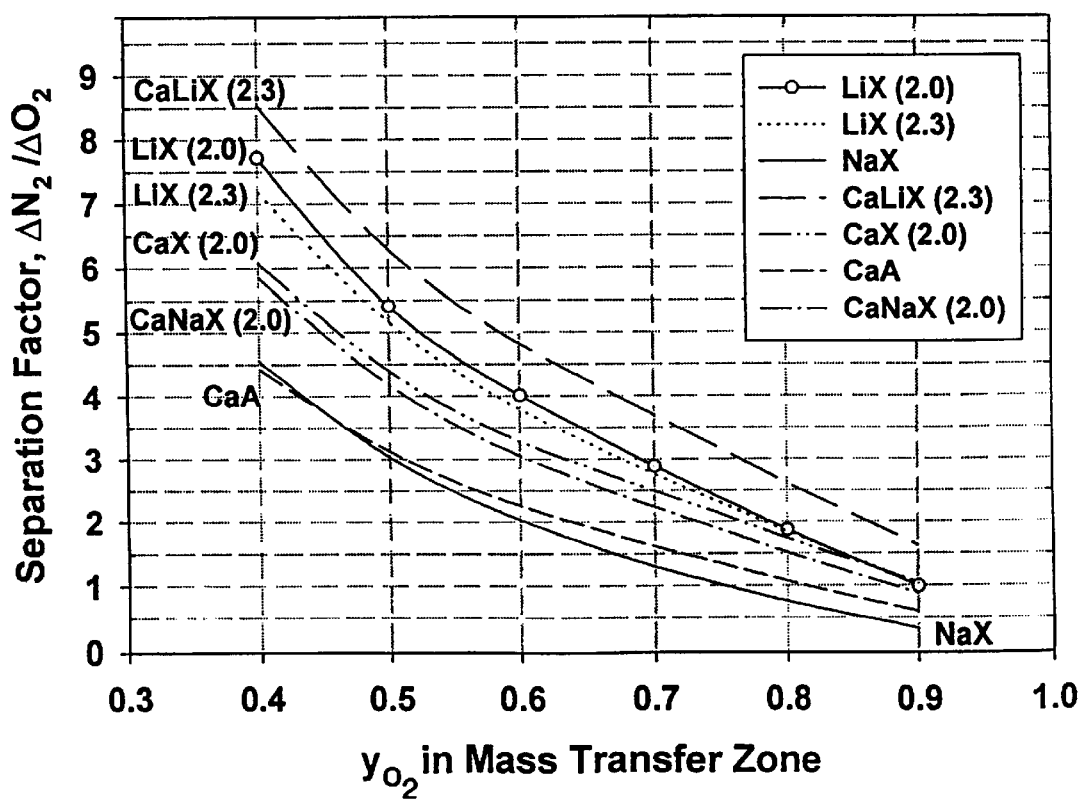
FIG. 6b is a graph showing the variation in adiabatic separation factor as a function of oxygen content in the mass transfer zone of the adsorbent bed, for a series of adsorbents.

The adiabatic separation factor and adiabatic $O_2$ working capacity were determined as a function of $O_2$ mole fraction for seven adsorbents as shown in FIGS. 6a and 6b. This evaluation was performed at a temperature of 320° K at the end of the adsorption step in conjunction with a variable temperature swing (e.g. the temperature swing decreased with increasing $O_2$ mole fraction in the mass transfer zone as shown in FIG. 2). Adsorption and desorption pressures were 1.5 bar and 0.3 bar, respectively.

It is evident from FIG. 6a that LiX (2.3), CaLiX (2.3), CaA and NaX adsorbents all have lower $O_2$ retention over the entire mass transfer zone compared to LiX (2.0). Since LiX is a preferred adsorbent in the equilibrium zone, each of these materials substituted into the mass transfer zone may provide an improvement over an adsorber containing LiX (2.0) in both zones.

However, high adiabatic $N_2/O_2$ selectivity must also be maintained in order to minimize the size of the transfer zone. CaLiX (2.3) best satisfies the combined mass transfer zone criteria of reduced adiabatic $O_2$ working capacity and high adiabatic selectivity as shown in FIGS. 6a and 6b. The properties of this adsorbent are superior for the mass transfer zone relative to those of LiX (2.0). Conversely, the adiabatic separation factors for NaX and CaA are substantially lower than the other adsorbents shown in FIG. 6b. Consequently, NaX and CaA are not good choices for the mass transfer zone. LiX (2.3) has a lower adiabatic $O_2$ working capacity and a slightly lower selectivity than LiX (2.0). This adsorbent is still expected to show improvement when used in the mass transfer zone in conjunction with LiX (2.0) in the equilibrium zone as compared to LiX (2.0) in both zones. The increased adiabatic $O_2$ working capacities and decreased adiabatic separation factors of CaX (2.0) and CaNaX (2.0), relative to LiX (2.0), are exactly opposite to the desired properties in the mass transfer zone, and thus should not be used.

The methods and examples described above provide a means for selecting the most effective adsorbents for the equilibrium and mass transfer zones in the adsorber. It is expected that such selections will satisfy the objective of improved process performance. In order to verify this expectation, a computer model was applied to simulate adiabatic VPSA $O_2$ processes for various deployments of adsorbents in the equilibrium and mass transfer zones. $O_2$ recovery and productivity, power and BSF were determined from these simulations.

EXAMPLE

Non-layered adsorbers containing only LiX (2.3) or LiX (2.0) and layered adsorbers containing LiX (2.0) in the equilibrium zone and either LiX (2.3) or CaLiX (2.3) in the transfer zone were investigated. The total amount of adsorbent was the same in all adsorbers. For the purpose of this example, the adsorbent in the mass transfer zones of the layered beds represented 25% of the main adsorbent volume which corresponds to the approximate size of the mass transfer zone in a non-layered LiX adsorber operating under similar conditions.

The process conditions included a feed molar flux of approximately 17 moles/m²·second, a feed pressure of 1.5 bar, ambient temperature of 70° F., and a final desorption pressure of 0.3 bar. A basic VPSA cycle was used which included adsorption, pressure equalizations, evacuation, purge and repressurization with feed. The model represented a two-bed system (nominal 60 TPDO capacity) where the two beds operate in parallel and out of phase with each other. A nominal 60s cycle was used, although cycle time was varied slightly between the test cases to maintain $O_2$ product purity at 90%. Process performance was normalized for all configurations to the performance of the adsorber containing only LiX (2.3). The results are compared in the table below.

|  | LiX (2.3) | LiX (2.0) | LiX (2.0) + LiX (2.3) 75/25 | LiX (2.0) + CaLiX 75/25 |
|---|---|---|---|---|
| $O_2$ Recovery | 1 | 1.01 | 1.05 | 1.07 |
| $O_2$ Productivity | 1 | 1.01 | 1.05 | 1.07 |
| BSF | 1 | 0.96 | 0.94 | 0.92 |
| Power | 1 | 0.99 | 0.97 | 0.95 |

The modest improvement in process performance of the non-layered LiX (2.0) over that of LiX (2.3) is consistent with the expectations of the adiabatic separation factor and adiabatic $N_2$ working capacity results of FIGS. 3 and 4 for the bed temperature range of 300 K to 320 K. The lower BSF of the LiX (2.0) results from the higher adiabatic $N_2$ working capacity of this adsorbent. The layered configuration of LiX (2.0) with LiX (2.3) in the mass transfer zone resulted in improvements in $O_2$ recovery and productivity of 5% and a reduction in BSF of 6% compared to the LiX (2.3) non-layered adsorber. The LiX (2.0)/CaLiX (2.3) combination was even better, with 7% improvements in $O_2$ recovery and productivity and an 8% reduction in BSF. In all cases the unit power was reduced as a result in the increase in $O_2$ recovery. It is noted that while the examples above describe only a single adsorbent for each of the two main adsorbent zones, the invention is not limited to such a configuration.

One skilled in the art of adsorption will appreciate that the relative sizes of the equilibrium and mass transfer zones varies according to the components to be separated, the process conditions and the adsorbent properties. Thus, this invention is not limited to a fixed ratio of adsorbents for the two zones for a given type of separation. On the contrary, the ratio of adsorbents shall be the same as the ratio of the sizes of the equilibrium and mass transfer zones that exist at the end of the adsorption step. Methods for estimating the size of each zone are well known in the art. For example, one may use process simulations and the results obtained therefrom as illustrated in FIG. 2.

In the practice of the invention, it is conceivable that the deployment of several different adsorbents in the equilibrium zone as layers may provide the optimum adiabatic selectivity and adiabatic $N_2$ working capacity, depending upon the thermal conditions within the zone. It may also be preferred to layer more than one type of adsorbent across the light component concentration gradient in the mass transfer zone in order to reduce the total adiabatic oxygen delta loading in that zone. When there are more than two components to be separated, more than a single main adsorbent may be required, i.e. each main adsorbent zone may consist of an equilibrium zone followed by a mass transfer zone for each component separation to be affected.

Another feature of the present invention is the selection of advanced adsorbents for improved efficiency of heavy component removal in small (e.g. about 30° F.) to moderate (e.g. about 35–50° F.) thermal gradients. On the one hand, such adsorbents generally have a stronger affinity for the heavy component, a higher heat of adsorption and a greater thermal swing. On the other hand, higher separation efficiency is achieved for these stronger absorbents operating at lower adsorption/desorption pressure ratios than weaker adsorbents operating at higher pressure ratios. Lower pressure ratios favor reduced temperature swings and smaller bed thermal gradients. While the examples given so far represent modest bed thermal gradients for a pressure ratio of 5.0, even smaller gradients and temperature swings are achieved at lower pressure ratios. By lower pressure ratios we mean: from about 1.4 to about 4 for subatmospheric and transatmospheric processes, and from about 1.4:1 to 2.5:1 for superatmospheric processes.

Adsorbent evaluations and selection for deployment in adsorption zones as demonstrated above has been repeated for lower adsorption/desorption pressure ratios. As a non-limiting example, the adiabatic separation factors are compared for several adsorbents at a pressure ratio of 3.0 ($P_H$=1.5 bar, $P_L$=0.5 bar) in FIG. 7. This comparison applies to conditions in the equilibrium zone for the same adsorbents shown in FIG. 5.

Figure 7:
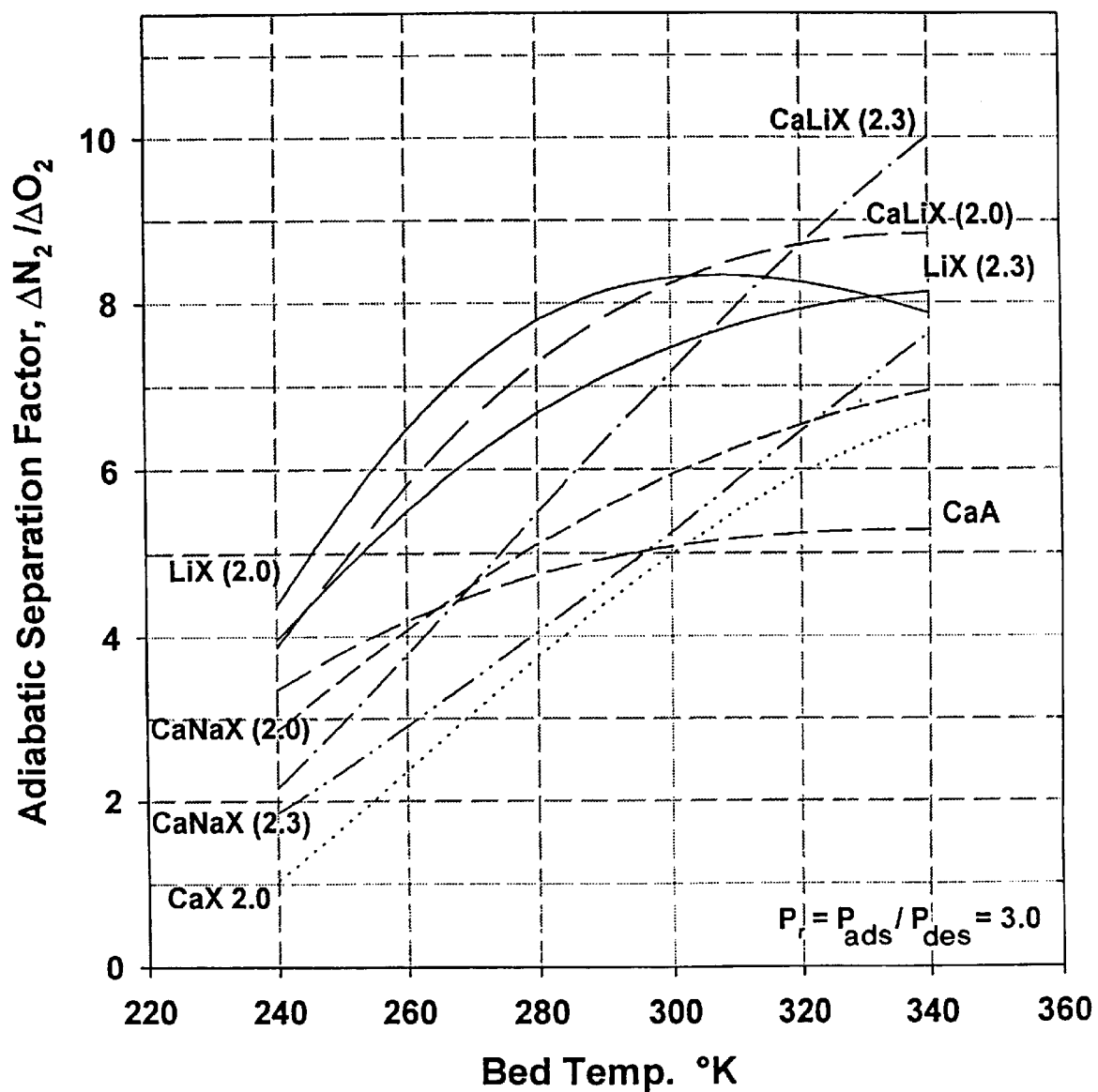
FIG. 7 is a graph showing the variation of adiabatic separation factor with bed temperature (wherein the temperature is measured at the end of adsorption), for a series of adsorbents at a pressure ratio (adsorption pressure:desorption pressure) of 3.

As can be seen from FIG. 7, the separation factors for these adsorbents decreased at the lower pressure ratio, but the relative performance of the various adsorbents remained about the same as in FIG. 5. Similar results were obtained for the mass transfer zone. Consequently, the selection of adsorbents for the two zones remained unchanged at the lower pressure ratio for this group of materials, although the temperature range of application shifts a small amount in some cases.

Layered beds containing highly-exchanged LiX and mixed cation LiX adsorbents have been shown to provide improved VPSA $O_2$ production efficiency and thermal stability in the bed temperature range of 280 K to 320 K. There will be, however, conditions such as ambient temperature extremes, that force operation outside this range of bed temperatures. In such cases, other adsorbents can be used in the equilibrium zone alone or along with LiX (2.0) or LiX (2.3). For example, in higher temperature operations, a layer of LiX adsorbent would be used in that part of the equilibrium zone at bed temperatures less than 320 K followed by a layer of one of the CaLiX mixed cation adsorbents as suggested in FIG. 5 and FIG. 7 for higher temperatures.

When the temperature near the feed end of the bed is below 270 K, the results of FIG. 3 suggest NaX adsorbent followed by LiX in the equilibrium zone. The amount of NaX in the equilibrium zone must be kept to a minimum of less than 15%, preferably less than 10% of the main adsorbent volume, because of the thermal instability of this adsorbent. Larger fractions of NaX in the equilibrium zone are likely to result in further amplification of the cold region and the formation of the deep cold zones typical of the prior art.

Finally, other high lithium-exchanged adsorbents (Li only and mixed cation varieties) are likely to be applicable to air separation. Deployment of such adsorbents in layers according to the present invention is expected to provide significantly improved process efficiency for those adsorbents. Some examples of such adsorbents are disclosed in Chao et al. (U.S. Pat. No. 5,174,979). There are many other such examples.

The present invention is particularly well-suited to cycle times of less than about two minutes and bed depths of less than about six feet in length where the mass transfer zone is a larger fraction of the total adsorbent bed size. Furthermore, it is understood that the layering concepts set forth in this invention apply equally well in axial flow, radial flow, lateral flow and other such fixed bed arrangements. The invention in its various embodiments may employ adsorption pressures up to about 1 or about 2 bar, and desorption pressures from about 0.25 to about 1.0 bar.

Specific features of the invention are shown in one or more of the drawings for convenience only, as such feature may be combined with other features in accordance with the invention. Alternative embodiments will be recognized by those skilled in the art and are intended to be included within the scope of the claims.

What is claimed is:

1. A process for the separation of a more selectively adsorbable component from a gas mixture including a less selectively adsorbable component, wherein said gas mixture is contacted with an adsorbent bed, wherein said adsorbent bed comprises an equilibrium zone and a mass transfer zone, and wherein the equilibrium and mass transfer zones each include at least one adsorbent material, wherein said at least one adsorbent material is selective for the adsorption of said more selectively adsorbable component, and wherein said at least one adsorbent material included in said mass transfer zone has a comparatively high adiabatic separation factor for the more adsorbable material and a comparatively low adiabatic delta loading for the less adsorbable component under the process conditions applicable to said mass transfer zone; and wherein said at least one adsorbent material included in said equilibrium zone has a comparatively high adiabatic separation factor for the more adsorbable component and comparatively high adiabatic dynamic capacity for the more adsorbable component under the process conditions applicable to said equilibrium zone.

2. The process of claim 1, wherein the more adsorbable component is nitrogen and the less adsorbable component is oxygen.

3. The process of claim 1, wherein said adsorbent material included in the mass transfer zone is CaLiX and the adsorbent material included in the equilibrium zone is LiX.

4. The process according to claim 1, wherein said adsorbent bed further comprises a pretreatment zone, and wherein said pretreatment zone comprises a material selected from the group consisting of zeolites, activated alumina, activated carbon and silica gel.

5. The process of claim 4, wherein the pretreatment zone comprises less than about 12% of the total adsorbent volume in said adsorbent bed.

6. The process of claim 1, wherein said adsorbent material included in the equilibrium zone and the mass transfer zone is a LiX material.

7. The process of claim 1, wherein said adsorbent material in the equilibrium zone is LiX having a silica/alumina ratio of 2.0 and said adsorbent material in the mass transfer zone is LiX having a silica/alumina ratio of 2.3.

8. The process of claim 1, wherein said gas mixture is air.

9. The process of claim 1, wherein said adsorbent bed is selected from the group consisting of axial flow beds, radial flow beds and lateral flow beds.

10. The process according to claim 1, wherein said equilibrium zone and said mass transfer zone have an adverse temperature swing between adsorption and desorption, and wherein said at least one adsorbent material included in either the equilibrium zone or the mass transfer zone is included in view of said adverse temperature swing in either the equilibrium zone or the mass transfer zone.

11. The process of claim 1, wherein at least one of said process conditions is gas composition.

12. An adsorbent bed wherein said bed comprises an equilibrium zone and a mass transfer zone, and wherein the equilibrium and mass transfer zones each comprise at least one adsorbent material, selective for the adsorption of a more selectively adsorbable component from a mixture including a less selectively adsorbable component, and wherein said at least one adsorbent material included in the mass transfer zone has a comparatively high adiabatic separation factor for the more adsorbable material and a comparatively low adiabatic delta loading for the less adsorbable component under the process conditions applicable to said mass transfer zone; and wherein said at least one adsorbent material included in said equilibrium zone has a comparatively high adiabatic separation factor for the more adsorbable component and a comparatively high adiabatic dynamic capacity for the more adsorbable component under the process conditions applicable to said equilibrium zone.

13. The adsorbent bed of claim 12, wherein at least one of said process conditions is gas composition.

* * * * *